(12) United States Patent
Stroppiana

(10) Patent No.: US 7,259,116 B2
(45) Date of Patent: Aug. 21, 2007

(54) SYNTHETIC MATERIAL SHEET FOR STABILIZING COVERINGS

(75) Inventor: Fernando Stroppiana, Grinzane Cavour (IT)

(73) Assignee: Mondo S.p.A., Gallo d'Alba (IT)

( * ) Notice: Subject to any disclaimer, the term of this patent is extended or adjusted under 35 U.S.C. 154(b) by 187 days.

(21) Appl. No.: 10/729,363

(22) Filed: Dec. 5, 2003

(65) Prior Publication Data

US 2004/0152386 A1 Aug. 5, 2004

(30) Foreign Application Priority Data

Dec. 6, 2002 (EP) ................................. 02425752

(51) Int. Cl.
*B32B 27/12* (2006.01)
*B32B 5/16* (2006.01)

(52) U.S. Cl. ...................... 442/294; 442/164; 442/172; 442/173; 442/381; 442/394; 442/396; 442/417; 442/373; 442/370; 442/416; 428/318.4

(58) Field of Classification Search ................ 442/381, 442/394, 396, 417, 164, 172, 173, 373, 370, 442/415; 428/285, 318.4

See application file for complete search history.

(56) References Cited

U.S. PATENT DOCUMENTS

| | | | | |
|---|---|---|---|---|
| 3,272,688 | A | | 9/1966 | Holmstrom et al. ......... 161/161 |
| 4,698,258 | A | * | 10/1987 | Harkins, Jr. ................. 442/373 |
| 4,853,280 | A | * | 8/1989 | Poteet ......................... 442/30 |

FOREIGN PATENT DOCUMENTS

| | | | |
|---|---|---|---|
| DE | 19544451 | * | 6/1995 |
| DE | EP-771644 | * | 5/1997 |
| DE | 195 44 451 A1 | | 6/1997 |
| DE | EP-781648 | * | 7/1997 |
| DE | 20301529 U1 | * | 6/2003 |
| EP | 0 203 042 A1 | | 11/1986 |
| EP | 0 771 644 A2 | | 5/1997 |
| EP | 0 781 648 A2 | | 7/1997 |
| IT | 67797-A/85 | | 9/1985 |
| JP | 409100618 A | * | 4/1997 |
| JP | 9324523 | * | 12/1997 |

OTHER PUBLICATIONS

Anonymous, "Subfloor Solutions," retrieved May 8, 2003 from http://www.altro.co.uk/uk/altroart/ftss/Subfloor&20Everlay.pdf, downloaded Apr. 16, 2004.

* cited by examiner

*Primary Examiner*—Norca L. Torres Velazquez
(74) *Attorney, Agent, or Firm*—Seed IP Law Group PLLC

(57) ABSTRACT

The present invention relates to a flexible sheet having a composite structure for stabilizing coatings, comprising a first layer of fiber material and a second layer of fiber material impregnated by a first and a second impregnating material, respectively, and a body layer set between said first layer and said second layer according to a general sandwich structure, where the body layer consists of a third material. The first and the second impregnating materials and the third material constituting the body layer are polymeric materials presenting a substantial affinity, so that the flexible sheet has a physically heterogeneous and chemically homogeneous structure.

27 Claims, 4 Drawing Sheets

SYNTHETIC MATERIAL SHEET FOR STABILIZING COVERINGS

CROSS-REFERENCE TO RELATED APPLICATION

This application claims priority to European Patent Application No. 02425752.9 entitled "Synthetic Material Sheet for Stablising Coverings", filed Dec. 6, 2002, which is incorporated herein by reference in its entirety.

FIELD OF THE INVENTION

The present invention relates to a sheet of synthetic material for stabilizing coatings, such as for example floorings or wall coatings.

BACKGROUND ART

In the laying of a flooring, as in the case of a wall coating, it is necessary for the substrate on which the flooring or wall coating is laid to be as flat as possible. It is moreover advantageous for the coating—whether this be in the form of a carpet, parquet, marble or ceramic tiles, or any other type of material—to be isolated from the substrate, the aim being to prevent any infiltration of moisture from the substrate itself, which could damage the coating, as well as to obtain a heat-insulating effect, i.e., reducing any heat losses.

In order to meet the needs outlined above, there have been available on the market for some time now flexible sheets made of synthetic material—referred to as stabilizing sheets—which are used as base for the laying of the coating. Said sheets are principally used for stabilizing floorings, i.e., they are set between the substrate to be coated and the final coating.

One of such stabilizing sheets is marketed by the present applicant under the commercial name EVERLAY and forms the subject of the Italian patent application No. 67797-A/85 in the name of the present applicant.

The sheet EVERLAY consists of a core layer of material made of silica-fibers (also commonly referred to as glass fibers) and two layers of plastic material applied on the opposite faces of the core layer.

This type of product, which has been used and marketed for some time now, has proved to be altogether satisfactory from the operative and functional points of view. It is, however, precisely the widespread use of this material that has shown that there is still further room for improvement; for example, as regards release into the environment of part of the silica fibers which make up the core layer (there being an increasing tendency to avoid this kind of phenomenon) and/or as regards other functional aspects and features of use.

SUMMARY OF THE INVENTION

The purpose of the present invention is to provide a sheet of synthetic material such as to enable the aforesaid improvements.

According to the invention, the said purpose is achieved thanks to the solution referred to specifically in the ensuing claims.

In the currently preferred embodiment, the invention relates to a flexible sheet having a composite structure comprising a first layer and a second layer of fiber material impregnated with respective impregnating materials of a substantially polymeric nature and a body layer set between the two fiber layers according to a general sandwich structure, where the body layer also consists of a polymeric material. The polymeric impregnating materials and the body layer present a chemical affinity, so that the sheet that forms the subject of the present invention is characterized by a chemical homogeneity and a physical heterogeneity.

Such a stabilizing sheet preferably envisages that the process of impregnation of the fiber material with a polymeric material causes a complete soaking of the fibers by the polymeric material.

From this point of view, the solution according to the invention is clearly distinguished from the solution described in EP-A-0 203 042. In said previous application there is envisaged the presence of a core layer sandwiched between two layers of fiber material that are generically not impregnated and hence designed to provide an overall effect of strengthening and stiffening: the solution described in EP-A-0 203 042 is, in fact, aimed at the production of a coating material made up of tiles, i.e., a rather rigid one.

A further advantage of the present invention is provided by the solidity of the sheet, which is very likely linked to the chemical homogeneity of the polymeric materials used—impregnating materials and material constituting the body layer. Albeit without wishing to be tied down to any theory in this regard, it is reasonable to believe that said homogeneity leads to a greater adhesion of the layers to one another, preventing the possibility of a separation of said layers, with consequent deterioration of said stabilizing sheet.

DESCRIPTION OF THE DRAWINGS

The invention will now be described, purely by way of non-limiting example, with reference to the annexed drawings, in which.

DESCRIPTION OF PREFERRED EMBODIMENTS OF THE INVENTION

Figure 1:
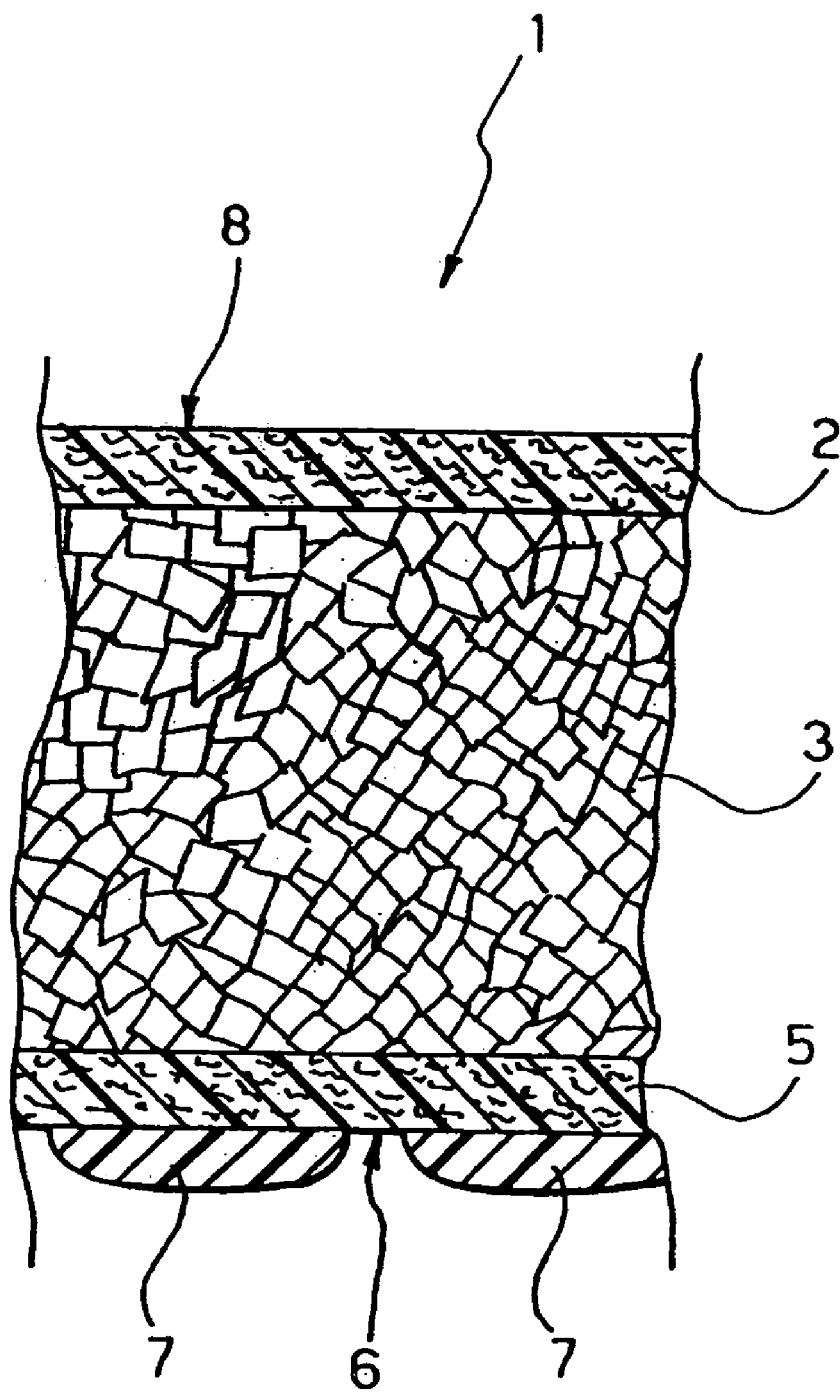
FIG. 1 is a cross-sectional view of a stabilizing sheet according to the invention.

With reference to FIG. 1, the number 1 designates, as a whole, the stabilizing sheet according to the invention.

The sheet 1 has a composite structure and comprises two layers 2 and 5 made of fiber material, impregnated with respective impregnating materials; set between the layers 2 and 5 is a body layer 3. The fiber material is advantageously made of silica fibers or polyester fibers, preferably silica fibers, with random orientation, such as not to present a direction of prevalent resistance.

The impregnating materials have preferably the same chemical composition and are made of thermoplastic polymeric materials, preferably chosen in the group made up of polyvinyl chloride (PVC), thermoplastic polyolefins (TPOs) and thermoplastic polyurethanes (TPUs). The impregnating material preferred according to the invention is polyvinyl chloride.

According to a preferred embodiment, the impregnating materials are made of a jellified polymeric material, and even more preferably of so-called polyvinyl chloride plastisol.

The body layer 3 consists of a third material, preferably a polymeric material originally in granular form, which assumes a compact structure via a process of compacting, preferably melting and pressing, so as to create a layer of melted granular material. The material in question is preferably a polymeric material, chosen in the group made up of polyvinyl chloride (PVC), thermoplastic polyolefins (TPOs) and thermoplastic polyurethanes (TPUs). The starting granular material preferred according to the invention is polyvinyl chloride.

The body layer 3 has preferably a thickness of less than 2 mm; still more preferably the thickness is approximately 1.5 mm.

Since the impregnating materials of the fiber layers 2 and 5 and the third material constituting the body layer 3 are polymeric materials that present a substantial affinity/identity, the sheet 1 has a structure that is physically heterogeneous (on account of the presence of the fiber material of the layers 2 and 5) and chemically homogeneous.

The chemical homogeneity of these materials leads to a better adhesion of the layers 2, 3 and 5 between one another, and hence the production of a markedly compact structure free from risks of separation of the layers.

In the embodiment represented in FIG. 1, on the bottom surface 6 of the layer 5, i.e., on the surface that is to be set facing the substrate to be coated, there is present a further layer 7 made of a foam-structure material, preferably in the form of distinct areolas. Said foam material is preferably polyvinyl chloride foam.

The function of the layer 7 is to provide a support for the sheet 1, a support which further increases the capacity of the sheet 1 for reducing the irregularity of the substrate on which the flooring or coating is to be laid.

Figure 3:
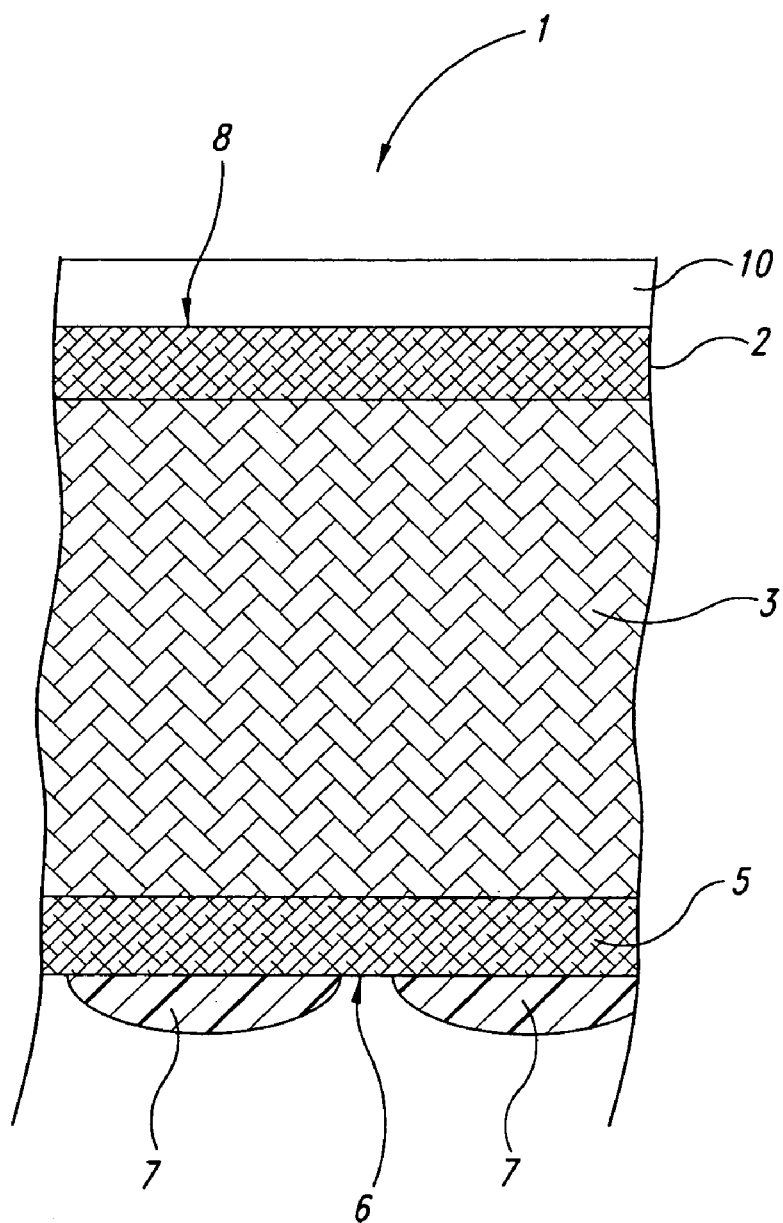
FIG. 3 is a cross-sectional view of a stabilizing sheet including an adhesive material.

The sheet 1 may moreover present, on one or on both of the surfaces 6 and 8 of the fiber layers 5 and 2, respectively, a layer of adhesive material or glue for facilitating both laying of the sheet 1 itself on the substrate to be coated and laying of the flooring or final coating on the sheet 1. According to a preferred embodiment, said adhesive material 10 is present on the surface 8 of the layer 2 and is a highly tacky glue, as shown in FIG. 3.

Figure 4:
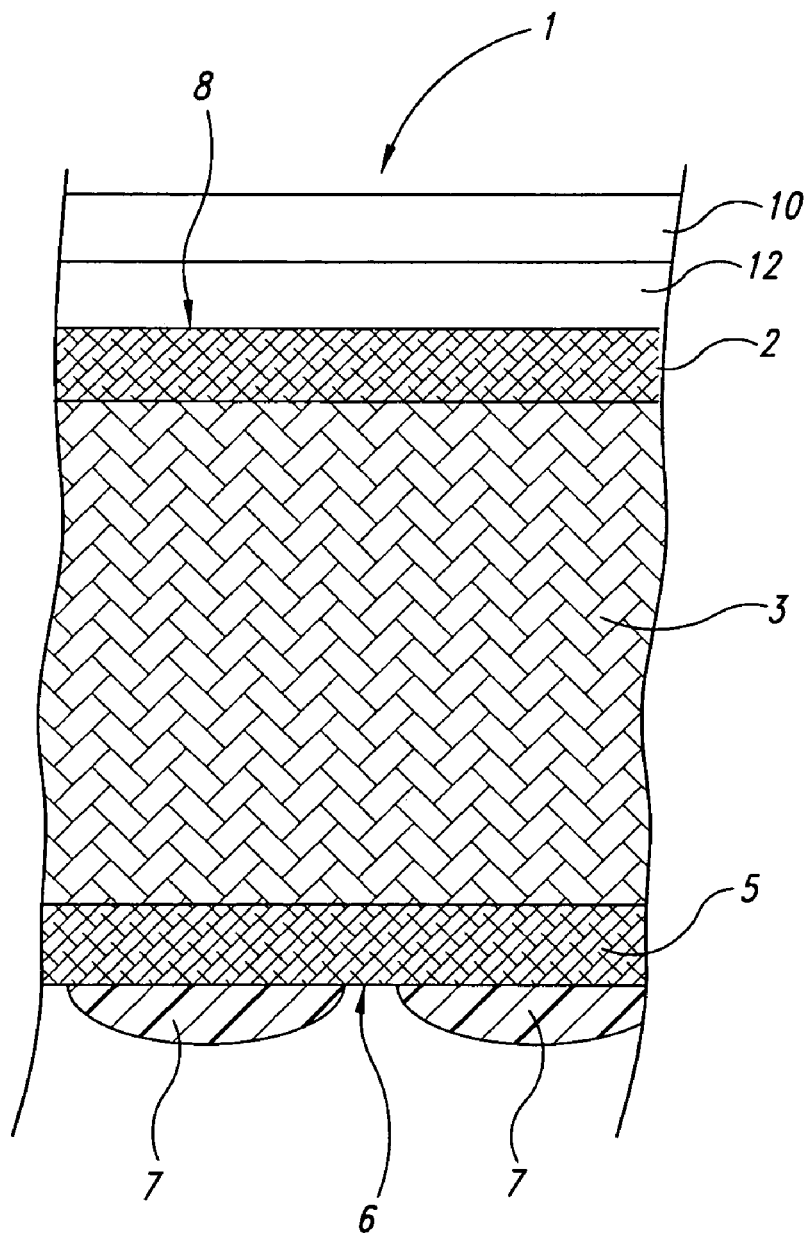
FIG. 4 is a cross-sectional view of a stabilizing sheet including an absorbing material and an adhesive material.

The sheet 1 may present on the surface 8 of the layer 2 in alternative to the layer of adhesive material 10 a layer of absorbing material 12 intended for absorbing an adhesive material or glue 10 subsequently applied thereto, in case the adhesive material or glue 10 require a substrate in the form of such an absorbing layer 12 for being employed, as shown in FIG. 4. In a preferred embodiment the absorbing material 12 is constituted by a non-woven textile having a density ranging from about 50 to 150 g/m$^2$. In another preferred embodiment the absorbing material presents non oriented fibers; most preferably the absorbing material is a polyester non-woven textile with non oriented fibers.

Figure 2:
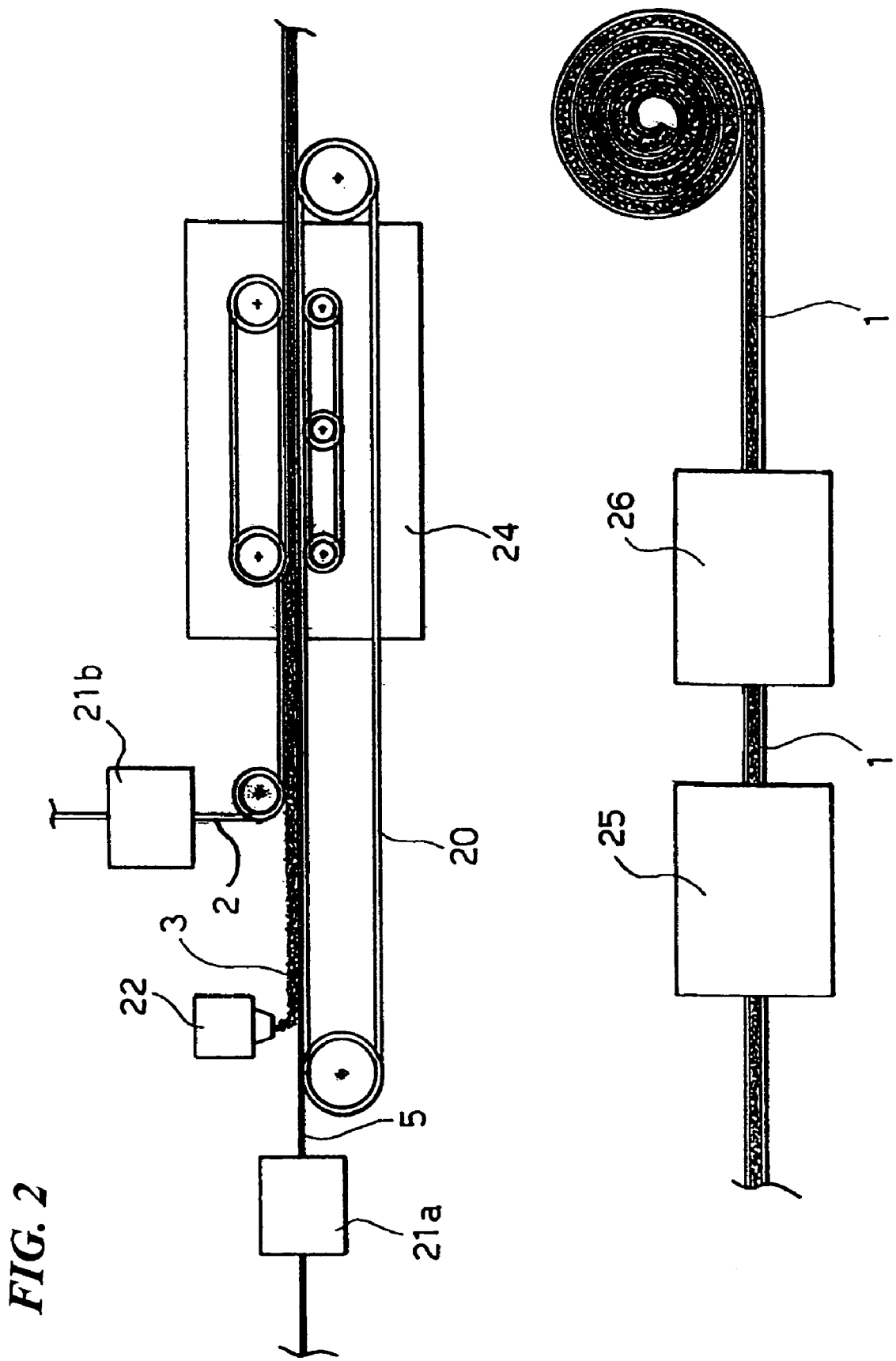
FIG. 2 is a schematic representation of the device for production of the stabilizing sheet according to the invention.

FIG. 2 is a schematic representation of the device for the production of the sheet 1.

On a first production line 21a—in itself known—there is produced the first layer 5 of fiber material impregnated with the corresponding impregnating material. In a parallel way, there is produced—on a second production line 21b, which is also in itself known—the second layer 2 of fiber material impregnated with the corresponding impregnating material.

On the first layer 5, which is fed by a conveyor belt 20, a "seeding" device 22 is used for depositing the granules of polymeric material that is to constitute the body layer 3. Above the granular layer thus deposited there is then laid the second layer 2 of fiber material.

At this point the layer 5/granules/layer 2 complex is subjected, inside a device 24, to the joint application of heat and pressure, the aim being to achieve melting of the material in granular form constituting the body layer 3 and to generate the sandwich structure illustrated in FIG. 1.

The temperature inside the device 24 is typically approximately 165-170° C. at input and approximately 210-220° C. at output.

The sheet, which has a composite structure, is also subjected (via known pressing means) to a pressure which brings about compacting of the three layers 2, 3 and 5.

Next, there may be applied to the sheet 1—in a device 25 of a known type—the layer 7 in foam material with a structure having distinct areolas.

Also applied to the sheet 1, on one or on both the surfaces 6 and 8, there may be a layer of glue, this being performed using the device designated by 26.

At the end of the production line the sheet 1 is rolled up.

Of course, the details of implementation and the embodiments may be amply varied with respect to what is described and illustrated herein, without thereby departing from the scope of the present invention, as defined in the annexed claims.

The invention claimed is:

1. A sheet having a composite structure for stabilizing coatings, comprising:
    a first layer and a second layer, both made of fiber material impregnated with a first impregnating material and a second impregnating material, respectively; and
    a body layer set between said first layer and said second layer according to a general sandwich structure, said body layer being made of a third material, said first layer having a top outer surface and said second layer having a bottom outer surface;
    a layer of adhesive-absorbing material positioned on the top outer surface of the first layer;
    a layer of foam material in the form of distinct areolas positioned on the bottom outer surface of the second layer, wherein said first and second impregnating materials and said third material presenting a substantial affinity, so that said sheet has a physically heterogeneous and chemically homogeneous structure.

2. The sheet according to claim 1, wherein said first and second impregnating materials and said third material presenting a substantial affinity are polymeric materials comprising polyvinyl chloride, thermoplastic polyolefins and thermoplastic polyurethanes.

3. The sheet according to claim 2, wherein said polymeric materials presenting a substantial affinity is polyvinyl chloride.

4. The sheet according to claim 1, wherein said fiber material is silica fiber or polyester fiber.

5. The sheet according to claim 1, wherein said first and second impregnating materials is a jellified material.

6. The sheet according to claim 5, wherein said jellified material is polyvinyl chloride plastisol.

7. The sheet according to claim 1, wherein said third material constituting said body layer is a material obtained by compacting of granules.

8. The sheet according to claim 1, wherein said body layer has a thickness of less than 2 mm.

9. The sheet according to claim 8, wherein said body layer has a thickness of approximately 1.5 mm.

10. The sheet according to claim 1, further comprising a layer of glue.

11. The sheet according to claim 10, wherein said glue overlies the layer of the adhesive-absorbing material on the top outer surface of the first layer.

12. The sheet according to claim 10, wherein said glue underlies the bottom outer surface of the second layer in regions where the foam material is not present.

13. The sheet according to claim 10, wherein said glue is of a highly tacky type.

14. The sheet according to claim 1, wherein said layer of foam material consists of polyvinyl chloride foam.

15. The sheet according to claim 1, wherein said adhesive-absorbing material is constituted by a non-woven textile.

16. The sheet according to claim 1, wherein said adhesive-absorbing material presents a density ranging from about 50 to 150 g/m$^2$.

17. The sheet according to claim 15, wherein said non-woven textile presents non oriented fibers.

18. The sheet according to claim 1, wherein said adhesive-absorbing material is a polyester non-woven textile.

19. A composite sheet comprising;
   a multi-layer structure having a top surface and a bottom surface, said multi-layer structure including a top layer of a first fiber material embedded with a first polymeric material, a bottom layer of a second fiber material embedded with a second polymeric material and a body layer disposed between the top layer and the bottom layer, the body layer being made of a third polymeric material, and
   a foam material in the form of distinct areolas distributed in distinctive regions on the bottom surface of the multi-layer structure.

20. The composite sheet of claim 19 further comprising an adhesive layer.

21. The composite sheet of claim 20 wherein the adhesive layer is on the top surface of the multi-layer structure.

22. The composite sheet of claim 21 further comprising a layer of adhesive-absorbing material disposed between the adhesive layer and the top surface of the multi-layer structure, the adhesive-absorbing material being a non-woven textile.

23. The composite sheet of claim 20 wherein a adhesive layer is on the bottom surface of the multi-layer structure in regions where the foam material is not present.

24. The composite sheet of claim 23 further comprising a layer of adhesive-absorbing material disposed between the adhesive layer and the bottom surface of the multi-layer structure, the adhesive-absorbing material being a non-woven textile.

25. The composite sheet of claim 20 wherein the first, second and third polymeric materials are the same.

26. The composite sheet of claim 20 wherein the first, second and third polymeric materials are each poly(vinyl chloride).

27. The composite sheet of claim 20 wherein the foam material is poly(vinyl chloride).

* * * * *